Patented June 30, 1936

2,046,019

UNITED STATES PATENT OFFICE 2,046,019

METHOD FOR SEALING IN LEAD-IN WIRES

Wilhelm Flammiger, Berlin-Schmargendorf, and Max Rohde, Berlin, Germany, assignors to Siemens & Halske Aktiengesellschaft, Siemensstadt, near Berlin, Germany, a German company No Drawing. Application September 24, 1930, Serial No. 484,231. In Germany December 14, 1929

1 Claim. (Cl. 18—59)

This invention relates to a method of sealing leading-in wires through holes in plates of all kinds such as separating walls in switch rooms and the like where such wires have to be secured in a manner to prevent the passage of dampness.

At present the method of passing wires through walls, particularly in the case of equipment for the communication art it has been the practice to bind the wire with an insulating tape at the point of passage, the insulating tape plug being conical in shape and pulled tight in the opening, or the opening may be shaped conical and the tape plug pulled therein. It has also been the custom to cement the wires into the wall opening with lead monoxide. As wires are usually covered with an insulation however, which in consequence of its hygroscopical properties, gradually allows dampness to pass through the lead monoxide and very soon crumbles after it has hardened, thereby rendering the joint subject to the action of dampness. It has in some special cases, often been necessary to seal the switch room with a sealing compound so that dampness could not reach the polished parts of the switches, but this is inconvenient and expensive.

According to the present invention the wires are covered with a layer of unvulcanized rubber at the point of passage and secured therein by means of a suitable rubber cement. After this operation the rubber surrounding the wire is vulcanized according to any well known method.

In order to make the sealing effective in the case of insulated wires, particularly such wires having a waxed or unwaxed covering, especially right down to the metal core, it is advisable to coat the wire at the leading-in position with a rubber solution, so that an intimate connection is effected between the layer of rubber applied and the conductor. In the use of waxed wires it is also necessary to remove the wax impregnation before applying the rubber solution. This is accomplished by means of a suitable solving means such as, for example, gasoline. It is also advisable at the same time to clean the edges of the leading-in opening with said solving means so that the rubber layer obtains a good grip when being vulcanized. It is also advisable when using metal plates or passing lead sheath cable through openings in such plates, to treat the parts which come in contact with the rubber layer preferably before finishing off the leading-in position, in the manner described. It is also an expedient when passing bare wires through walls and the like that these wires be tinned at the point where they pass through the walls, for example, where they come in contact with the rubber.

The invention is also especially applicable when using plates of conducting material or materials not having good insulating qualities. When using such materials it is advisable to insert a bushing of unvulcanized rubber in the leading-in opening from one side until the flange provided rests against the plate, another flange adapted to grip the bushing is made of unvulcanized rubber and obtains a tight grip on the inserted bushing by means of vulcanizing.

The method of sealing lead-in wires can also be applied with great advantage when sealing off meter panels from call boxes or similar apparatus which is used in the communication art.

In this case it is preferable to first of all provide the meter panel with only those switching lines which connect the cable cores with the separate coil terminals, whereby wires belonging together, for example, a quad are passed through each opening in the meter panel and are cleaned in the manner heretofore described with gasoline at the point of passage through the wall. They are then brushed with a suitable rubber solution. The layer of unvulcanized kneadable rubber to be applied around the quad or the like at the leading-in position can either be applied by hand in the shape of a plug of the thickness of the meter panel, or the quads may each be passed through the opening and pressed tight by the insertion of the rubber which may be accomplished by means of suitable mechanical devices. The meter panel is then put into the vulcanizing oven and vulcanized under suitable temperature.

In the case of particularly thin plates the rubber plug may have a projection around the plate, so that the wires are guided for a greater length in order that a better seal is obtained and so that the vulcanized rubber plug can obtain a better hold on the plate. When employing thicker plates and also in the previously mentioned cases it is in certain instances sufficient to allow the vulcanizing process to continue until just the surface of both sides of the plate are vulcanized to a certain depth. In other cases it is advisable to stop the vulcanizing process at such a point so that a sufficient amount of elasticity is retained by the vulcanized rubber. This is of particular advantage insofar as certain strains are liable to arise from handling the line when making connections between cables and wire connections on the one hand, and coils and the wire connections on the other.

The intimate connection between the rubber packing and the neighboring surfaces of the walls through which the wires pass as well as the conductors themselves is due to the vulcanizing process whereby the rubber penetrates into the pores of the neighboring surfaces. In order to increase this effect it is in every case expedient to coat the surface which comes in contact with the rubber substance with a suitable rubber solution.

What is claimed is:

A method of flexibly sealing lead-in wires in panels and the like which comprises inserting in the apertures in the panel, through which it is desired to pass the wires, a bushing of unvulcanized rubber having a reduced portion and a flanged portion, in such a manner that the flange portion of the bushing engages the panel and the reduced portion protrudes through the opposite sides thereof, positioning a washer also of unvulcanized rubber, around the protruding portion of the bushing, passing the wires to be sealed through said bushing and securing the protruding portion of the bushing to the wire and to the washer simultaneously with the securing of the washer to the panel by vulcanizing the assembly at the outer surfaces only.

WILHELM FLAMMIGER.
MAX ROHDE.